United States Patent
Fujiwara

(10) Patent No.: US 11,243,533 B2
(45) Date of Patent: Feb. 8, 2022

(54) CONTROL APPARATUS FOR UNMANNED TRANSPORT MACHINE

(71) Applicant: ALPINE ELECTRONICS, INC., Tokyo (JP)

(72) Inventor: Manabu Fujiwara, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 164 days.

(21) Appl. No.: 16/152,696

(22) Filed: Oct. 5, 2018

(65) Prior Publication Data
US 2019/0212735 A1  Jul. 11, 2019

(30) Foreign Application Priority Data
Jan. 10, 2018 (JP) .............................. JP2018-002088

(51) Int. Cl.
| | |
|---|---|
| *G05D 1/00* | (2006.01) |
| *G06Q 10/08* | (2012.01) |
| *G05D 1/02* | (2020.01) |

(52) U.S. Cl.
CPC ......... *G05D 1/0088* (2013.01); *G05D 1/0212* (2013.01); *G06Q 10/0833* (2013.01)

(58) Field of Classification Search
CPC . G05D 1/0088; G05D 1/0212; G06Q 10/0833
See application file for complete search history.

(56) References Cited

U.S. PATENT DOCUMENTS

| | | | | | |
|---|---|---|---|---|---|
| 5,995,898 | A * | 11/1999 | Tuttle | ................... | G07B 15/063 |
| | | | | | 427/255.31 |
| 7,339,993 | B1 * | 3/2008 | Brooks | .......... | H04N 21/440263 |
| | | | | | 375/240.1 |
| 7,673,831 | B2 * | 3/2010 | Steele | ................... | B64C 39/024 |
| | | | | | 244/1 TD |

(Continued)

FOREIGN PATENT DOCUMENTS

| | | |
|---|---|---|
| JP | 2003-160231 | 6/2003 |
| JP | 5431639 | 3/2014 |

(Continued)

OTHER PUBLICATIONS

Japanese Office Action for 2018-002088 dated Aug. 3, 2021.

*Primary Examiner* — Thomas E Worden
(74) *Attorney, Agent, or Firm* — IPUSA, PLLC

(57) ABSTRACT

A control apparatus for an unmanned transport machine for delivering a package from a departure location to a destination includes a trouble information acquiring unit configured to acquire trouble information, a selection requesting unit configured to request a recipient of the package to select one option among a plurality of delivery method options when the trouble information indicates trouble occurring on a delivery route from the departure location to the destination, a candidate destination selecting unit configured to select candidate destinations corresponding to the delivery method options based on a current location of the unmanned transport machine and map information, and a destination determining unit configured to determine a new destination selected from the candidate destinations in accordance with the selected option.

5 Claims, 7 Drawing Sheets

(56) References Cited

U.S. PATENT DOCUMENTS

| | | | | |
|---|---|---|---|---|
| 7,946,530 B1* | 5/2011 | Talmage, Jr. | B64D 25/12 | 244/118.2 |
| 8,511,606 B1* | 8/2013 | Lutke | B64C 39/028 | 244/1 OOR |
| 9,051,043 B1* | 6/2015 | Peeters | B64C 19/00 | |
| 9,056,676 B1* | 6/2015 | Wang | B64F 1/22 | |
| 9,079,587 B1* | 7/2015 | Rupp | G05D 1/0289 | |
| 9,244,147 B1* | 1/2016 | Soundararajan | G01S 1/44 | |
| 9,381,916 B1* | 7/2016 | Zhu | G01S 13/931 | |
| 2002/0111914 A1 | 8/2002 | Terada et al. | | |
| 2002/0156645 A1* | 10/2002 | Hansen | G07F 17/12 | 705/333 |
| 2006/0122851 A1* | 6/2006 | Ryan | G06Q 10/0833 | 705/333 |
| 2009/0236470 A1* | 9/2009 | Goossen | B64C 39/024 | 244/115 |
| 2009/0314883 A1* | 12/2009 | Ariton | F41A 23/34 | 244/63 |
| 2011/0035149 A1* | 2/2011 | McAndrew | G05D 1/0038 | 701/466 |
| 2011/0264311 A1* | 10/2011 | Lee | H04N 7/183 | 701/15 |
| 2013/0026304 A1* | 1/2013 | Wang | B64C 29/0033 | 244/7 R |
| 2013/0081245 A1* | 4/2013 | Vavrina | B60L 53/51 | 29/402.08 |
| 2014/0032034 A1* | 1/2014 | Raptopoulos | G05D 1/0088 | 701/25 |
| 2014/0136414 A1* | 5/2014 | Abhyanker | G05D 1/024 | 705/44 |
| 2014/0149244 A1* | 5/2014 | Abhyanker | G06Q 10/10 | 705/26.2 |
| 2014/0254896 A1* | 9/2014 | Zhou | G07F 17/12 | 382/124 |
| 2014/0330456 A1* | 11/2014 | Lopez Morales | G05D 1/0022 | 701/3 |
| 2015/0006005 A1* | 1/2015 | Yu | G06Q 50/28 | 701/22 |
| 2015/0069968 A1* | 3/2015 | Pounds | B60L 11/1818 | 320/109 |
| 2015/0102154 A1* | 4/2015 | Duncan | G05D 1/0094 | 244/2 |
| 2015/0120094 A1* | 4/2015 | Kimchi | G05D 1/00 | 701/3 |
| 2015/0129716 A1* | 5/2015 | Yoffe | B64F 1/02 | 244/110 C |
| 2015/0158599 A1* | 6/2015 | Sisko | A47G 29/141 | 244/114 R |
| 2015/0175276 A1* | 6/2015 | Koster | B64F 1/00 | 244/114 R |
| 2015/0183528 A1* | 7/2015 | Walsh | A47G 29/14 | 701/3 |
| 2015/0246727 A1* | 9/2015 | Masticola | B64C 39/024 | 701/2 |
| 2015/0259078 A1* | 9/2015 | Filipovic | H01K 1/62 | 244/114 R |
| 2015/0317597 A1* | 11/2015 | Shucker | G06Q 10/0833 | 235/375 |
| 2015/0332206 A1* | 11/2015 | Trew | G06Q 10/083 | 705/330 |
| 2015/0367850 A1* | 12/2015 | Clarke | B60W 30/18154 | 701/28 |
| 2016/0009413 A1* | 1/2016 | Lee | B64F 1/007 | 701/16 |
| 2016/0033966 A1* | 2/2016 | Farris | A47G 29/141 | 701/15 |
| 2016/0068267 A1* | 3/2016 | Liu | B64C 19/00 | 701/11 |
| 2016/0144982 A1* | 5/2016 | Sugumaran | B64F 1/005 | 244/103 R |
| 2016/0196756 A1* | 7/2016 | Prakash | G08G 5/025 | 701/3 |
| 2016/0200438 A1* | 7/2016 | Bokeno | G05D 1/102 | 244/2 |
| 2016/0236778 A1* | 8/2016 | Takayama | B64C 39/02 | |
| 2016/0350711 A1* | 12/2016 | Tsao | G06Q 10/0833 | |
| 2017/0139424 A1* | 5/2017 | Li | G06Q 10/083 | |
| 2017/0200376 A1 | 7/2017 | Itabashi et al. | | |
| 2017/0249581 A1* | 8/2017 | Hens | G06Q 10/047 | |
| 2017/0293884 A1* | 10/2017 | Cheatham, III | G01G 19/07 | |
| 2017/0313421 A1* | 11/2017 | Gil | B65G 1/06 | |
| 2017/0323256 A1* | 11/2017 | Cheatham, III | G06Q 10/0832 | |
| 2017/0323257 A1* | 11/2017 | Cheatham, III | G06Q 10/0631 | |
| 2017/0372256 A1* | 12/2017 | Kantor | G08G 5/0013 | |
| 2018/0037322 A1* | 2/2018 | Buchmueller | G01C 21/343 | |
| 2018/0189728 A1* | 7/2018 | Jones | G06Q 10/0832 | |
| 2019/0147751 A1 | 5/2019 | Sasao | | |

FOREIGN PATENT DOCUMENTS

| | | |
|---|---|---|
| JP | 2017-126101 | 7/2017 |
| WO | 2017/216854 | 12/2017 |

* cited by examiner

FIG.5

M1: Current Time: 13:00

M2: Air transport is not available due to rain. Delivery is postponed until tomorrow or later as rain is expected until tomorrow.

M3: Select a Delivery Method.

○ No Change (Air Transport)

● Pick up at Convenient Store [Detail]

○ Change to Surface Transport [Detail]

[Send] [Cancel]

FIG.7

Specify Date and Time

Date of Delivery | 12/22

Time of Delivery | 12:00 to 15:00

Return

CONTROL APPARATUS FOR UNMANNED TRANSPORT MACHINE

BACKGROUND OF THE INVENTION

1. Field of the Invention

The disclosures herein relate to a controller for, and a method of controlling, an unmanned transport machine.

2. Description of the Related Art

In recent years, research has been underway to utilize an unmanned transport machine such as a drone for a delivery system. Drones have difficulty flying under bad weather conditions. Technology has thus been developed that allows a drone to avoid bad weather areas to reach a destination.

When a departure location or a destination location is experiencing bad weather, or when a wide area over the transport path is experiencing bad weather, it is difficult for a drone to fly and avoid bad weather areas. In such a case, there is no choice but to postpone the delivery time until the weather improves, which results in the problem of delayed delivery time.

Accordingly, there is a need for reducing a delay in delivery by an unmanned transport machine.

RELATED-ART DOCUMENTS

Patent Document

[Patent Document 1] Japanese Patent Application Publication No. 2017-126101

SUMMARY OF THE INVENTION

It is a general object of the present invention to provide a control apparatus and a control method that substantially obviate one or more problems caused by the limitations and disadvantages of the related art.

According to an embodiment, a control apparatus for an unmanned transport machine for delivering a package from a departure location to a destination includes a trouble information acquiring unit configured to acquire trouble information, a selection requesting unit configured to request a recipient of the package to select one option among a plurality of delivery method options when the trouble information indicates trouble occurring on a delivery route from the departure location to the destination, a candidate destination selecting unit configured to select candidate destinations corresponding to the delivery method options based on a current location of the unmanned transport machine and map information, and a destination determining unit configured to determine a new destination selected from the candidate destinations in accordance with the selected option.

According to at least one embodiment, a delay in delivery by an unmanned transport machine is reduced.

BRIEF DESCRIPTION OF THE DRAWINGS

Other objects and further features of the present invention will be apparent from the following detailed description when read in conjunction with the accompanying drawings, in which:

FIG. 5 is a drawing illustrating an example of a delivery method selection screen;

FIG. 7 is a drawing illustrating an example of a date-and-time selection screen.

DESCRIPTION OF THE PREFERRED EMBODIMENTS

Figure 1:
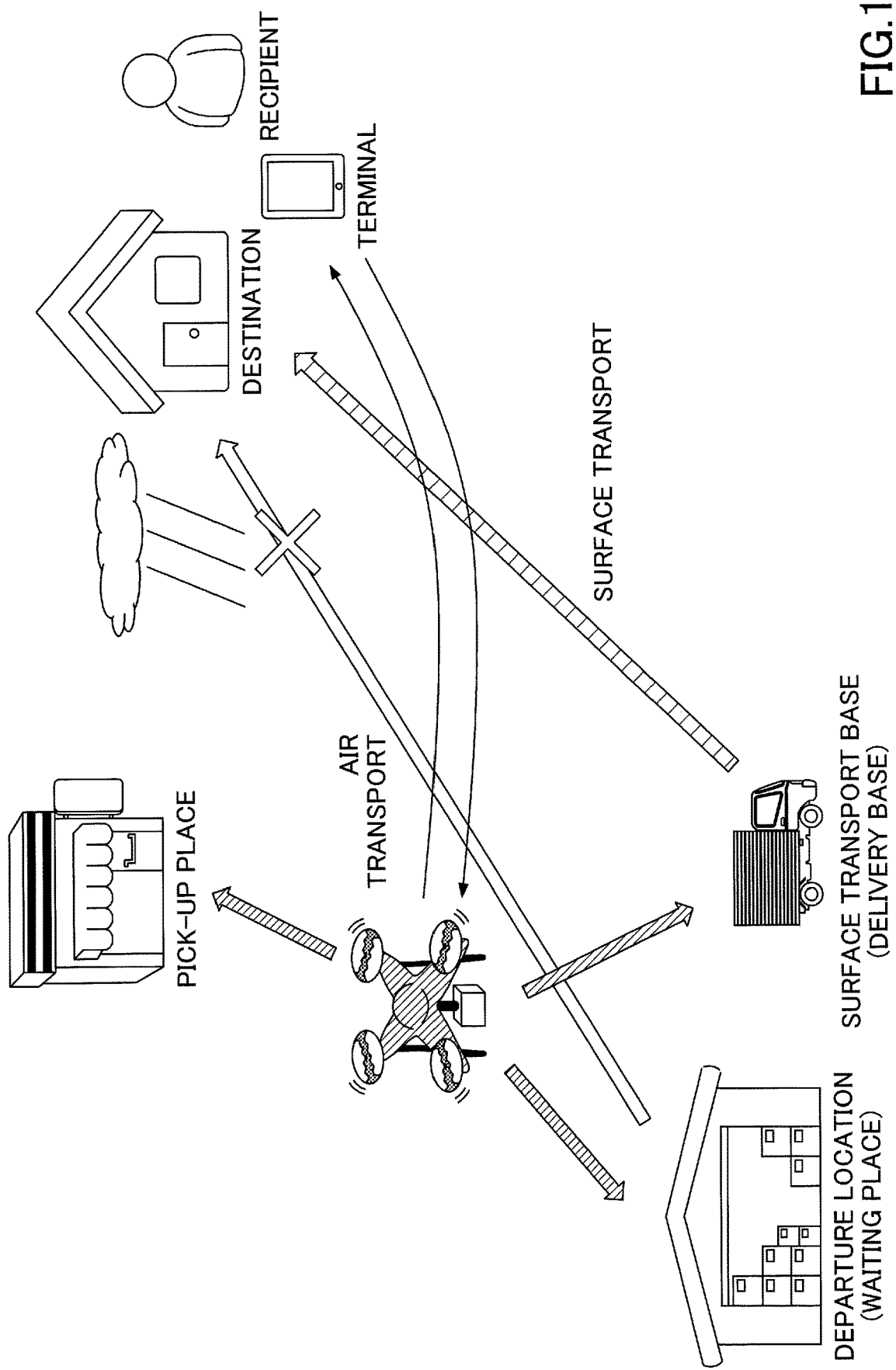
FIG. 1 is a drawing schematically illustrating an outline of a control method.

In the following, embodiments of the present invention will be described with reference to the accompanying drawings. In respect of descriptions in the specification and drawings relating to these embodiments, elements having substantially the same functions and configurations are referred to by the same reference numerals, and a duplicate description will be omitted.

A description will be given of a controller 1 and a control method for an unmanned transport machine according to an embodiment with reference to FIG. 2 through FIG. 7. The controller 1 of the present embodiment is a computer to control an unmanned transport machine that delivers a package from a departure location to a delivery location, and is installed on the unmanned transport machine. In the following, a description will be given of an example in which the unmanned transport machine is a drone. Nonetheless, the unmanned transport machine may alternatively be an autonomous vehicle.

An outline of the control method of the present embodiment will be described first. FIG. 1 is a drawing schematically illustrating an outline of the control method. As illustrated in FIG. 1, the controller 1 causes a drone carrying one or more packages to fly from a departure location to a destination location along a delivery route. A trouble such as rain along the delivery route may occur, resulting in the failure to fly the drone to the delivery destination. In such a case, the controller 1 wirelessly communicates with a terminal of the recipient, and asks the recipient to select a delivery method among a plurality of options such as maintaining the current delivery method, changing the delivery destination, changing the transport route, and the like. The controller 1 then determines a renewed delivery destination in response to the delivery method selected by the recipient, followed by causing the drone to fly to the renewed delivery destination. With this arrangement, the controller 1 may allow the drone to wait until the trouble disappears, or may cause the drone to deliver a package to a new pick-up location such as a shop, or may cause the drone to deliver a package to a land transport base to switch from air transport by the drone to surface transport by a vehicle.

Figure 2:
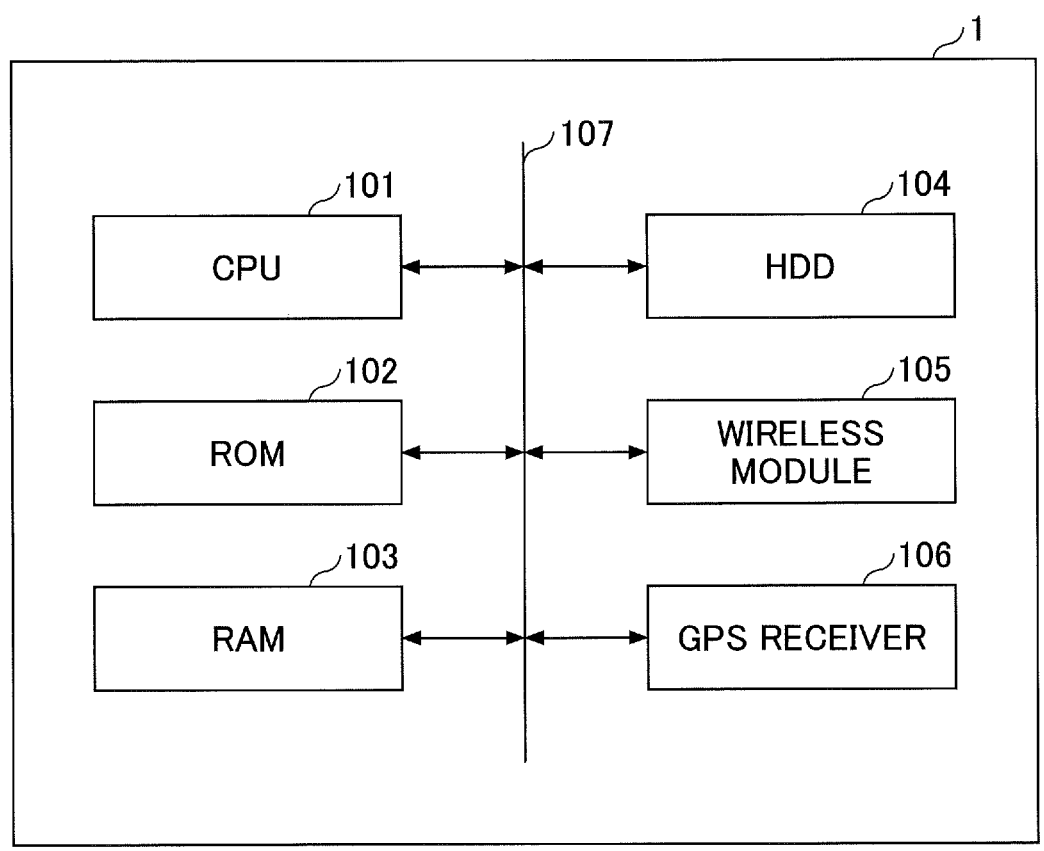
FIG. 2 is a drawing illustrating an example of the hardware configuration of a controller.

In the following, the hardware configuration of the controller 1 will be described. FIG. 2 is a drawing illustrating an example of the hardware configuration of the controller 1. The controller 1 illustrated in FIG. 2 includes a CPU (central processing unit) 101, a ROM (read only memory) 102, a RAM (random access memory) 103, an HDD (hard disk drive) 104, a wireless module 105, a GPS (global positioning system) receiver 106, and a bus 107.

The CPU 101 executes programs to control the each part of the controller 1 to implement the functions of the controller 1.

The ROM 102 stores programs executed by the CPU 101 and various types of data.

The RAM 103 provides a working space used by the CPU 101.

The HDD 104 stores programs executed by the CPU 101 and various types of data.

The wireless module 105 wirelessly communicates with an external device. The external device may be a control server installed at a drone control center, for example. It may be noted, however, that this is not a limiting example. The wireless communication standard used by the wireless module 105 may be WiFi (registered trademark), for example. It may be noted, however, that this is not a limiting example.

The GPS receiver 106 receives GPS signals from a plurality of GPS satellites to produce position information.

The CPU 101, the ROM 102, the RAM 103, the HDD 104, the wireless module 105, and the GPS receiver 106 are connected to each other through the bus 107.

Figure 3:
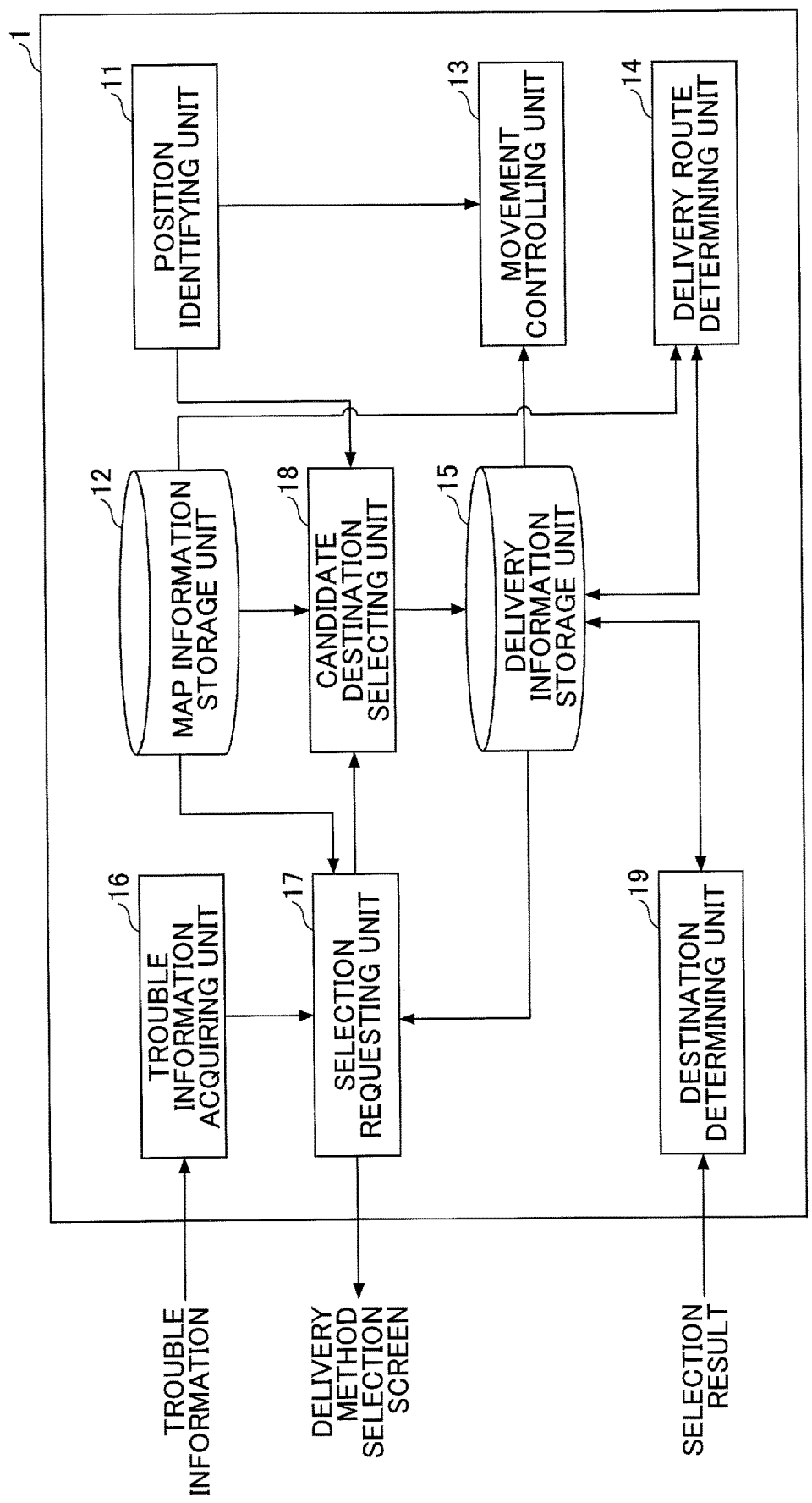
FIG. 3 is a drawing illustrating an example of the functional configuration of the controller.

In the following, the functional configuration of the controller 1 will be described. FIG. 3 is a drawing illustrating an example of the functional configuration of the controller 1. The controller 1 illustrated in FIG. 3 includes a position identifying unit 11, a map information storage unit 12, a movement controlling unit 13, a delivery route determining unit 14, a delivery information storage unit 15, a trouble information acquiring unit 16, a selection requesting unit 17, a candidate destination selecting unit 18, and a destination determining unit 19. The position identifying unit 11 is implemented as the GPS receiver 106. The movement controlling unit 13, the delivery route determining unit 14, the trouble information acquiring unit 16, the selection requesting unit 17, the candidate destination selecting unit 18, and the destination determining unit 19 are realized by the CPU 101 executing programs. The map information storage unit 12 and the delivery information storage unit 15 are implemented as memory media such as the ROM 102, the RAM 103, and the HDD 104.

The position identifying unit 11 identifies the current location of a drone on which the controller 1 is installed.

The map information storage unit 12 stores map information.

The movement controlling unit 13 controls one or more motors or engines for driving rotors to control the flight (i.e., movement) of a drone. At the time of delivering a package, the movement controlling unit 13 controls the drone based on the current location of the drone and the delivery route, such that the drone flies toward its destination along the delivery route.

The delivery route determining unit 14 determines the delivery route from the current location or the departure location to the destination based on position information indicative of the current location or the departure location, position information indicative of the destination, and map information. Any method may be employed to determine the delivery route. The delivery route determining unit 14 may select the delivery route that is a straight path to the destination, for example, or may select the delivery route that is the shortest path made by avoiding obstacles existing along the way to the destination.

The delivery information storage unit 15 stores package-specific information (hereinafter referred to as delivery information) regarding the delivery of a given package. Delivery information may be input into the controller 1 through a memory medium, or may be input through radio communication from an external device. Delivery information includes identification information identifying a package (i.e., a package ID), position information indicative of the departure location and the destination of the package, the delivery route from the departure location to the destination, the date and time of planed delivery, and a planned departure time. Delivery information may also include the name, address, and contact information of a recipient, description of the contents, and the like. The delivery information storage unit 15 also stores package-specific information about candidate destinations (hereinafter referred to as candidate destination information). Candidate destination information will be described later.

The trouble information acquiring unit 16 acquires information about troubles (hereinafter referred to as trouble information). Troubles refer to events that prevent the flight (movement) of the drone. Troubles include bad weather (rain, winds, etc.), disasters (typhoons or the like), restrictions (e.g., no-fly zones), and running out of battery. Trouble information includes at least one of the following: weather information, disaster information, restriction information, and flyable-distance (i.e., reachable-distance) information. The trouble information acquiring unit 16 may receive weather information, disaster information, restriction information, and the like from an external device through wireless communication.

The trouble information acquiring unit 16 may also generate flyable-distance information based on the remaining charge of the battery and the delivery route. Flyable-distance information indicates the distance that the drone can fly. A drone's flyable distance varies depending on the strength and direction of winds. The trouble information acquiring unit 16 may thus generate flyable-distance information by taking into account weather information. The selection requesting unit 17, which will be described later, compares the drone's flyable distance with the distance from the current location to the destination along the delivery route, thereby checking whether the drone can fly to reach the destination, i.e., whether the battery will run out. The trouble information acquiring unit 16 sends the acquired information to the selection requesting unit 17.

The selection requesting unit 17 checks based on the trouble information and the delivery route whether there is a trouble on the delivery route. In the case of trouble occurring on the delivery route, the selection requesting unit 17 requests the recipient of the package to select one of the plurality of options regarding delivery methods. Specifically, the selection requesting unit 17 wirelessly transmits a selection request to the recipient's terminal for displaying a delivery method selection screen. The recipient's terminal may be a smartphone, a tablet terminal, a portable phone, or a personal computer, for example. These are not limiting examples.

The delivery method selection screen is a display screen requesting that one of the plurality of delivery method options be selected. The delivery method selection screen shows a plurality of delivery method options and a message requesting that one of the options be selected. The delivery method options include at least one of the following: "maintaining the current delivery method", "changing the destination", and "changing the transport route". The option "maintaining the current delivery method" corresponds to delivery by the drone. The option "changing the destination" corresponds to changing from the old destination to a new destination. The option "changing the transport route" corresponds to changing from air transport by the drone to surface transport by a vehicle, an example of which includes an autonomous car. In the case of the unmanned transport machine being an autonomous vehicle, the option "maintaining the current delivery route" corresponds to delivery by the autonomous vehicle, and the option "changing the transport route" corresponds to changing from surface transport by the autonomous vehicle to air transport by a drone. The delivery method options are not limited to the above-noted examples.

The selection requesting unit 17 may generate a delivery method selection screen and transmit the screen data of the delivery method selection screen as a selection request, or may transmit information indicative of a link to a delivery method selection screen as a selection request.

In the case of trouble occurring on the delivery route, the candidate destination selecting unit 18 selects candidate destinations corresponding to the delivery method options based on the current location of the drone and the map information. These candidate destinations are at the locations which are within a predetermined distance from the current location of the drone and to which the drone can fly without being obstructed by the trouble.

To be more specific, the candidate destination selecting unit 18 selects one waiting place at which the drone will be waiting until the trouble disappears, as a candidate destination corresponding to the option "maintaining the current delivery route". The waiting place may be the departure location or a distribution station of the delivery company. In the case of the unmanned transport machine being an autonomous car, the waiting place may be the departure location, a distribution station of the delivery company, or a parking space. When there are a plurality of waiting places around the current location of the unmanned transport machine, the candidate destination selecting unit 18 may select the waiting place that is the closest to its current location.

Further, the candidate destination selecting unit 18 selects one or more pick-up places at which the recipient will receive the package, as candidate destinations corresponding to the option "changing the destination". The pick-up places may be a shop such as a convenience store or a distribution station of the delivery company, for example.

Moreover, the candidate destination selecting unit 18 selects one delivery base for a renewed transport route (for surface transport), as a candidate destination corresponding to the option "changing the transport route". The delivery base may be a surface-transport base such as a truck terminal or a distribution station of the delivery company. In the case of the unmanned transport machine being an autonomous car, the delivery base may be a distribution station of the delivery company or an air transport base such as a drone terminal. When there are a plurality of delivery bases around the current location of the unmanned transport machine, the candidate destination selecting unit 18 may select the delivery base that is the closest to its current location.

The destination determining unit 19 determines a new destination based on the selected delivery method wirelessly received from the recipient's terminal. In the case of the option "maintaining the current delivery method" being selected, the destination determining unit 19 selects the waiting place for the option "maintaining the current delivery method" as a new destination. In the case of the option "changing the destination" being selected, the destination determining unit 19 selects the pick-up place for the option "changing the destination" as a new destination. In the case of the option "changing the transport route" being selected, the destination determining unit 19 selects the delivery base for the option "changing the transport route" as a new destination.

Figure 4:
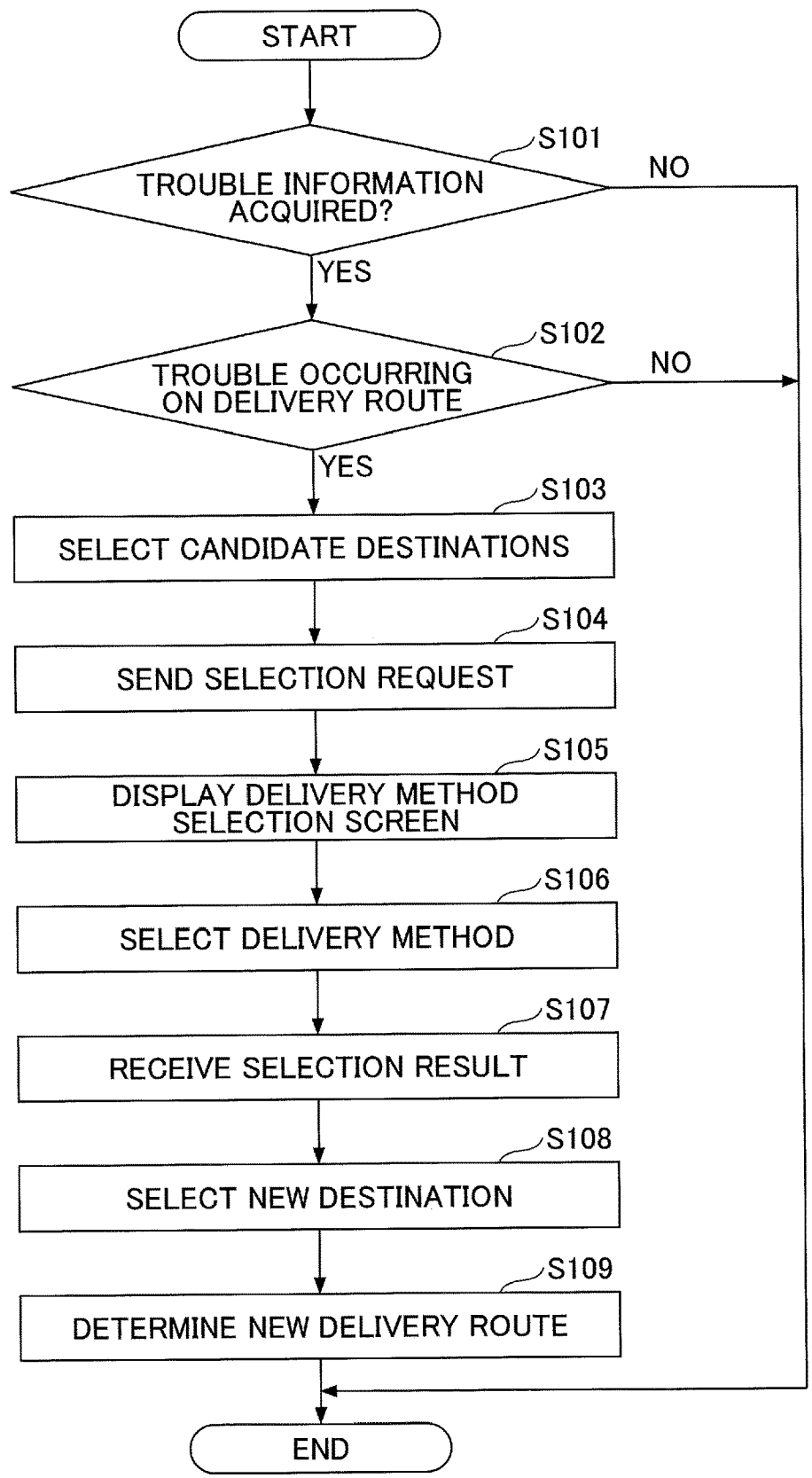
FIG. 4 is a flowchart illustrating an example of a method of controlling a drone.

In the following, a method of controlling a drone according to the present embodiment will be described. FIG. 4 is a flowchart illustrating an example of a method of controlling a drone. The controller 1 performs the procedure illustrated in FIG. 4 at constant intervals or at a predetermined timing (e.g., immediately before the departure of a drone). In the following, a description will be given with respect to an example in which the drone is flying to the destination along the delivery route under the control of the movement controlling unit 13. Alternatively, the drone may be on standby at the departure location.

The selection requesting unit 17 checks whether the trouble information acquiring unit 16 has acquired trouble information (step S101). The procedure comes to an end where the trouble information acquiring unit 16 has not acquired trouble information (NO in step S101).

In the case in which the trouble information acquiring unit 16 has acquired trouble information (YES in step S101), the selection requesting unit 17 reads map information from the map information storage unit 12, and reads the delivery route from the delivery information storage unit 15. The selection requesting unit 17 then checks, based on the map information, the delivery route, and the trouble information, whether the trouble is present on the delivery route (step S102). In the case of no trouble on the delivery route (NO in step S102), the procedure comes to an end.

In the case of trouble being present on the delivery route (YES in step S102), the selection requesting unit 17 requests the candidate destination selecting unit 18 to select candidate destinations corresponding to the delivery method options. Upon being requested to select candidate destinations, the candidate destination selecting unit 18 reads the map information from the map information storage unit 12, and also receives the current location from the position identifying unit 11. Based on the map information and the current location, the candidate destination selecting unit 18 selects a waiting place for the option "maintaining the current delivery method", one or more pick-up places for the option "changing the destination", and a delivery base for the option "changing the transport route" (step S103). The candidate destination selecting unit 18 stores the candidate destination information indicative of the selected candidate destinations in the delivery information storage unit 15 such that the candidate destination information is associated with the delivery methods. The candidate destination information includes location information indicative of the locations of candidate destinations and the names of candidate destinations.

Upon the candidate destinations being selected, the selection requesting unit 17 reads the candidate destination information from the delivery information storage unit 15, and generates a delivery method selection screen based on the retrieved candidate destination information, followed by transmitting a selectin request to the recipient's terminal (step S104).

Upon receiving the selection request, the recipient's terminal displays the delivery method selection screen generated by the selection requesting unit 17 (step S105). FIG. 5 is a drawing illustrating an example of a delivery method selection screen. The delivery method selection screen illustrated in FIG. 5 shows a transmission time M1 of the selection request, trouble and status information M2, a message M3 requesting selection of a delivery method, delivery method options, radio buttons allowing a recipient to select a delivery method, detail buttons corresponding to the respective options, a send button, and a cancel button.

In the example illustrated in FIG. 5, the delivery method options include "no change (air transport)" corresponding to "maintaining the current delivery method", "pick up at a convenient store" corresponding to "changing the destination", "change to surface transport" corresponding to "changing the transport route". In this example, the option "pick up at a convenient store" is selected. Further, detail buttons corresponding to "pick up at a convenient store" and "change to surface transport" are also displayed. Clicking the detail button corresponding to the option "pick up at a convenient store" causes a pick-up-place selection screen to be displayed to allow the recipient to select a pick-up place. Clicking the detail button corresponding to the option "change to surface transport" causes a date-and-time selection screen to be displayed to allow the recipient to specify the date and time of delivery.

Figure 6:
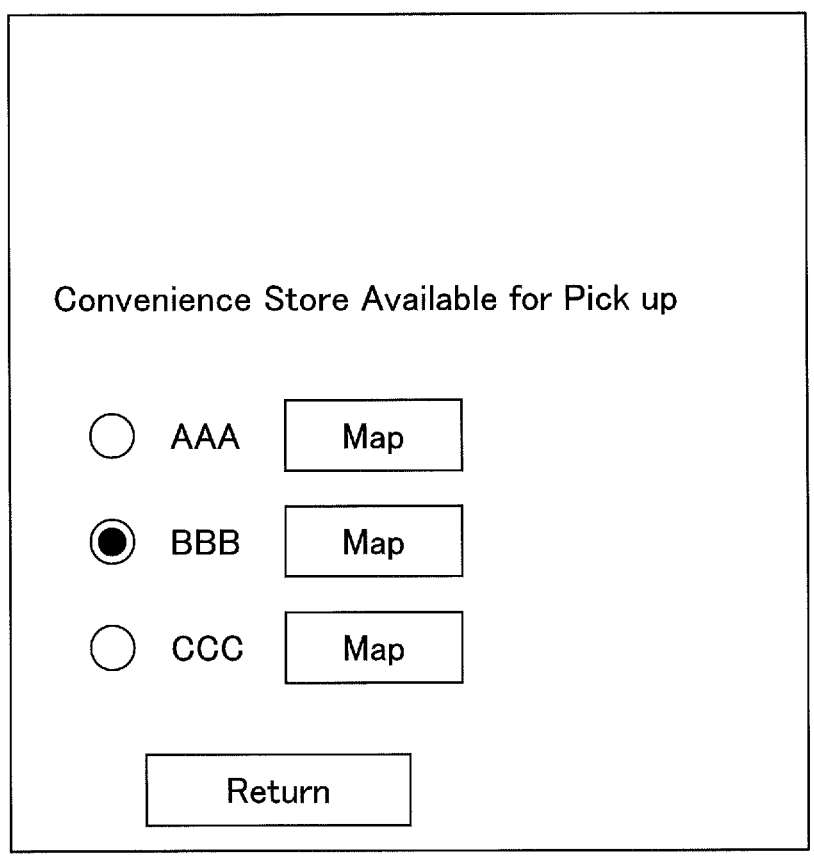
FIG. 6 is a drawing illustrating an example of a pick-up-place selection screen.

FIG. 6 is a drawing illustrating an example of a pick-up-place selection screen. The pick-up-place selection screen illustrated in FIG. 6 shows the names of pick-up places selected as candidate destinations by the candidate destination selecting unit 18 for the option "changing the destination", radio buttons allowing a recipient to select a pick-up place, map buttons for displaying the location of a pick-up-place on a map, and a return button for switching to a delivery method selection screen. In the example illustrated in FIG. 6, "BBB" is selected as the pick-up place.

FIG. 7 is a drawing illustrating an example of a date-and-time selection screen. The date-and-time selection screen illustrated in FIG. 7 shows a delivery date input field, a delivery time input field, and a return button for switching to a delivery method selection screen. In the example illustrated in FIG. 7, the delivery date is set to December 22, and the delivery time is set to 12:00 to 15:00.

The recipient selects a desired delivery method on the delivery method selection screen that is displayed on his/her terminal. In the case of selecting "pick up at a convenient store", the recipient further selects the pick-up place on the pick-up-place selection screen. In the case of selecting "change to surface transport", the recipient specifies the date and time of delivery on the date-and-time selection screen. Subsequently, the recipient clicks the send button on the delivery method selection screen. Upon the clicking of the send button, the terminal wirelessly transmits the selection result to the controller 1. The selection result includes information about the delivery method selected by the recipient. The selection result also includes information about the pick-up place selected by the recipient in the case of "pick up at a convenient store" being selected, and includes information about the date and time of delivery specified by the recipient in the case of "change to surface transport" being selected.

The delivery method selection screen, the pick-up-place selection screen, and the date-and-time selection screen are not limited to the examples illustrated in FIG. 5 through FIG. 7. Two or more of the delivery method selection screen, the pick-up-place selection screen, and the date-and-time selection screen may be simultaneously displayed on the display screen.

Upon the recipient's terminal sending the selection result, the destination determining unit wirelessly receives the selection result (step S107). Having received the selection result, the destination determining unit 19 reads candidate destination information from the delivery information storage unit 15, and selects a new destination that is the candidate destination corresponding to the delivery method selected by the recipient (step S108). The destination determining unit 19 selects the waiting place as a new destination in the case of "maintaining the current delivery method" being selected, and selects the pick-up place selected by the recipient as a new destination in the case of "changing the destination" being selected. Also, the destination determining unit 19 selects the delivery base as a new destination in the case of "changing the transport route" being selected.

In the case in which the option "changing the destination" or "changing the transport path" is selected, the destination determining unit 19 stores the newly selected destination as the place of delivery in the delivery information storage unit 15. With this arrangement, the place of delivery is updated. In the case in which the option "maintaining the current delivery method" is selected, the destination determining unit 19 stores the newly selected destination as a transit point to the place of delivery in the delivery information storage unit 15. In the case in which the option "changing the transport, route" is selected, the destination determining unit 19 stores the date and time of delivery included in the selection result as the date and time of planed package delivery in the delivery information storage unit 15. With this arrangement, the date and time of planned package delivery is updated. In so doing, it is preferable for the destination determining unit 19 to update the date and time of planned departure according to the updated date and time of planned delivery.

Subsequently, the delivery route determining unit 14 reads map information from the map information storage unit 12 and the new destination from the delivery information storage unit 15, and receives the current location from the position identifying unit 11. The delivery route determining unit 14 then determines a new delivery route from the current location to the new destination (step S109). In the case in which the option "changing the destination" or "changing the transport path" is selected, the delivery route determining unit 14 stores the newly determined delivery route as a package delivery route in the delivery information storage unit 15. With this arrangement, the package delivery route is updated. In the case in which the option "maintaining the current delivery method" is selected, the delivery route determining unit 14 stores the newly determined delivery route as a delivery route to the transit point in the delivery information storage unit 15. Thereafter, the drone flies to the new destination along the new delivery route under the control of the movement controlling unit 13.

As described heretofore, the controller 1 requests the recipient to select a delivery method in the case of trouble occurring on the delivery route, followed by delivering a package to a destination matching the selection result. This arrangement enables the delivery of a package to a pick-up place requested by the recipient or the delivery of a package through another transport route, without waiting for the cessation of trouble, in the case in which the trouble occurring on the delivery route makes it difficult for the unmanned transport machine to deliver the package. Accordingly, a delay in delivery by an unmanned transport machine is reduced.

The controller 1 may arrange for the unmanned transport machine to be on standby at the current location, or may alternatively arrange for the unmanned transport machine to move toward a waiting place, until receiving a selection result after transmitting a selection request. In the case of the unmanned transport machine being a drone, the controller 1 may arrange for the unmanned transport machine to be on standby at a predetermined waiting space (e.g., on the top of a utility pole). This serves to reduce power consumption by the drone.

Upon failing to receive a selection result within a predetermined period following the transmission of a selection request, the controller 1 may determine that the option "maintaining the current delivery method" is deemed to be selected, followed by causing the unmanned transport machine to move to a waiting place.

Upon receiving a selection result, the controller 1 may transmit a message acknowledging the receipt of the selection result to the recipient's terminal.

In the case of a trouble occurring on the delivery route (YES in step S102), the controller 1 may search for a new delivery route avoiding the areas where the trouble has occurred based on the current location, the map information, and the trouble information. Upon finding a new delivery route, the controller 1 may cause the unmanned transport machine to move along the new delivery route. Upon failing to find a new delivery route, the controller 1 may perform the processes in step S103 and onwards. Any known methods may be utilized as the method of finding a new delivery route.

The functional configuration of the controller 1 is not limited to the example illustrated in FIG. 3. For example, one or more of the following units: the map information storage unit 12, the delivery route determining unit 14, the trouble information acquiring unit 16, the selection requesting unit 17, the candidate destination selecting unit 18, and the destination determining unit 19, may be provided in an external apparatus (e.g., in a control server). In such a case, the computer installed on the unmanned transport machine and the external apparatus together realize the function of the controller 1. To be more specific, the external apparatus may be a computer which have the same configuration as that shown in FIG. 2, except that a GPS receiver may not have to be provided. The wireless modules of these computers enable communication between the computers. These computers, each of which includes a CPU (i.e., processor), a memory, and a wireless module, operate in association with each other to implement the functional configuration of the controller 1. The external apparatus may be situated at the departure location illustrated in FIG. 1, as a non-limiting example.

The present invention is not limited to the configurations described in connection with the embodiments that have been described heretofore, or to the combinations of these configurations with other elements. Various variations and modifications may be made without departing from the scope of the present invention, and may be adopted according to applications.

The present application is based on and claims priority to Japanese patent application No. 2018-002088 filed on Jan. 10, 2018, with the Japanese Patent Office, the entire contents of which are hereby incorporated by reference.

What is claimed is:

1. A control apparatus for an unmanned transport machine for delivering a package, comprising:
a memory; and
a processor coupled to the memory and configured to:
control movement of the unmanned transport machine;
acquire, through wireless communication, trouble information indicating an occurrence of an event that could prevent the movement of the unmanned transport machine on a delivery route from a departure location to an original destination;
select, in response to the indicated occurrence the event, candidate destinations corresponding to delivery options based on a current location of the unmanned transport machine and map information, the current location being obtained through a GPS receiver of the unmanned transport machine, the map information being retrieved from the memory, the candidate destinations including a default destination for at least two of the delivery options, the delivery options including a first option of maintaining a delivery method via the unmanned transport machine, a second option of changing the original destination, and a third option of changing the delivery method to one in which a transport means is different from the unmanned transport machine, the candidate destinations including a waiting place of the unmanned transport machine for the first option, one or more pick-up places for the second option, and a delivery base for the third option, the waiting place for the unmanned transport machine and the delivery base each being the default destination;
request, through wireless transmission initiated in response to the indicated occurrence of the event, a recipient of the package to select one option among the delivery options and to select, when the default destination is not provided for the selected one option, a first candidate destination among the candidate destinations for the selected one option; and
determine an updated destination, to replace the original destination, the updated destination being either the default destination for the selected one option or the first candidate destination selected by the recipient of the package for the selected one option,
wherein the processor controls the movement of the unmanned transport machine so as to bring the unmanned transport machine to the updated destination, and
wherein with respect to the requesting the recipient of the package, the processor is configured to cause a terminal device of the recipient to display a delivery option selection screen that shows the trouble information, the delivery options, selecting buttons, and detail buttons, the delivery options including the first option, the second option, and the third option, the detail buttons being provided for the second option and the third option, the selecting buttons each allowing the recipient to select a corresponding one of the delivery options on the delivery option selection screen, and the detail buttons each allowing the recipient to display another option-specific screen on which to decide details of a corresponding one of the delivery options of either the second option or the third option.

2. The control apparatus as claimed in claim 1, wherein the processor is configured to send data regarding the delivery options to the terminal device of the recipient.

3. The control apparatus as claimed in claim 1, wherein the processor is configured to select one or more of the candidate destinations based on being within a predetermined distance from the current location and to which the unmanned transport machine is not prevented from moving by the occurrence of the event indicated by the trouble information.

4. The control apparatus as claimed in claim 1, wherein the trouble information includes at least one of the following: weather information, disaster information, restriction information, and reachable-distance information.

5. A method of controlling an unmanned transport machine for delivering package, comprising:
- acquiring trouble information through wireless communication, the trouble information indicating an occurrence of an event that could prevent movement of the unmanned transport machine on a delivery route from a departure location to an original destination;
- selecting, in response to the indicated occurrence of the event, candidate destinations corresponding to delivery options based on a current location of the unmanned transport machine and map information, the current location being obtained through a GPS receiver of the unmanned transport machine, the map information being retrieved from a memory, the candidate destinations including a default destination for at least two of the delivery options, the delivery options including a first option of maintaining a delivery method via the unmanned transport machine, a second option of changing the original destination, and a third option of changing the delivery method to one in which a transport means is different from the unmanned transport machine, the candidate destinations including a waiting place of the unmanned transport machine for the first option, one or more pick-up places for the second option, and a delivery base for the third option, the waiting place for the unmanned transport machine and the delivery base each being the default destination;
- requesting, through wireless transmission initiated in response to the indicated occurrence of the event, a recipient of the package to select one option among the delivery options and to select, when the default destination is not provided for the selected one option, a first candidate destination among the candidate destinations for the selected one option;
- determining an updated destination to replace the original destination, the updated destination being either the default destination for the selected one option or the first candidate destination selected by the recipient of the package for the selected one option; and
- controlling movement of the unmanned transport machine so as to bring the unmanned transport machine to the updated destinations
- wherein the requesting the recipient of the package includes causing a terminal device of the recipient to display a delivery option selection screen that shows the trouble information, the delivery options, selecting buttons, and detail buttons, the delivery options including the first option, the second option, and the third option, the detail buttons being provided for the second option and the third option, the selecting buttons each allowing the recipient to select a corresponding one of the delivery options on the delivery option selection screen, and the detail buttons each allowing the recipient to display another option-specific screen on which to decide details of a corresponding one of the delivery options of either the second option or the third option.

* * * * *